United States Patent
Sun et al.

(10) Patent No.: US 12,430,360 B2
(45) Date of Patent: Sep. 30, 2025

(54) TRANSACTION LOG SERVICE WITH LOCAL LOG REPLICAS

(71) Applicant: Microsoft Technology Licensing, LLC, Redmond, WA (US)

(72) Inventors: Zhengguo Sun, Redmond, WA (US); Girish Mittur Venkataramanappa, Redmond, WA (US); Batuhan Tasdoven, Redmond, WA (US); Zhiyou Liu, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 758 days.

(21) Appl. No.: 17/644,977

(22) Filed: Dec. 17, 2021

(65) Prior Publication Data

US 2023/0195751 A1    Jun. 22, 2023

(51) Int. Cl.
G06F 16/27    (2019.01)
G06F 16/23    (2019.01)

(52) U.S. Cl.
CPC ........ G06F 16/273 (2019.01); G06F 16/2379 (2019.01)

(58) Field of Classification Search
CPC ............................ G06F 16/273; G06F 16/2379
See application file for complete search history.

(56) References Cited

U.S. PATENT DOCUMENTS

| | | | | |
|---|---|---|---|---|
| 8,615,486 | B2* | 12/2013 | Wetmore | G06F 11/2097 707/633 |
| 9,223,843 | B1* | 12/2015 | Madhavarapu | G06F 16/2365 |
| 9,613,120 | B1* | 4/2017 | Kharatishvili | G06F 16/2358 |
| 9,785,510 | B1* | 10/2017 | Madhavarapu | G06F 3/065 |
| 10,169,169 | B1* | 1/2019 | Shaikh | G06F 11/2094 |
| 10,521,403 | B1* | 12/2019 | Hupfeld | G06F 11/1471 |
| 10,803,012 | B1* | 10/2020 | Madhavarapu | G06F 16/113 |
| 10,929,428 | B1* | 2/2021 | Brahmadesam | G06F 16/2379 |
| 11,144,407 | B1* | 10/2021 | Shankar | G06F 11/1469 |
| 11,301,462 | B1* | 4/2022 | Dye | G06F 16/27 |
| 11,341,163 | B1* | 5/2022 | Sridharan | G06F 16/252 |
| 11,360,689 | B1* | 6/2022 | Grunwald | G06F 3/0616 |
| 2004/0172421 | A1* | 9/2004 | Saito | G06F 16/1834 |

(Continued)

OTHER PUBLICATIONS

Juchang, et al., "Parallel Replication Across Formats for Scaling Out Mixed OLTP/OLAP Workloads in Main-Memory Databases", In Journal of VLDB vol. 27, Issue 3, Apr. 16, 2018, pp. 421-444.

(Continued)

*Primary Examiner* — Mark E Hershley
(74) *Attorney, Agent, or Firm* — ArentFox Schiff LLP

(57) ABSTRACT

The present application relates to database management in a cloud environment. A compute service generates a transaction log for database actions. The compute service writes at least a first portion of the transaction log to a log replica service. The log replica service replicates at least the first portion of the transaction log to two or more local log replicas persisted on solid state drives. A page server service updates database data in a remote storage based on at least a second portion of the transaction log retrieved from at least one of the log replicas. The page server service moves at least the second portion of the transaction log to the remote storage. The log replica service truncates the local log replicas by purging the second portion.

20 Claims, 9 Drawing Sheets

(56) References Cited

U.S. PATENT DOCUMENTS

| | | | | |
|---|---|---|---|---|
| 2005/0289169 | A1* | 12/2005 | Adya | G06F 11/1482 |
| 2008/0228832 | A1* | 9/2008 | Wetmore | G06F 11/2097 |
| 2010/0274768 | A1* | 10/2010 | Wang | G06F 16/27 |
| | | | | 711/135 |
| 2011/0178984 | A1* | 7/2011 | Talius | G06F 16/27 |
| | | | | 707/634 |
| 2013/0110774 | A1* | 5/2013 | Shah | G06F 11/2035 |
| | | | | 707/610 |
| 2014/0279930 | A1* | 9/2014 | Gupta | G06F 11/1464 |
| | | | | 707/683 |
| 2014/0324785 | A1* | 10/2014 | Gupta | G06F 16/2358 |
| | | | | 707/689 |
| 2015/0378845 | A1* | 12/2015 | Shang | G06F 11/1474 |
| | | | | 707/648 |
| 2018/0144015 | A1* | 5/2018 | Mittur Venkataramanappa | G06F 16/273 |
| 2019/0294582 | A1* | 9/2019 | Zhu | H04L 67/1097 |
| 2019/0325055 | A1* | 10/2019 | Lee | G06F 11/1448 |
| 2019/0332582 | A1* | 10/2019 | Kumar | H04L 67/1095 |
| 2019/0332692 | A1* | 10/2019 | Rachapudi | G06F 16/907 |
| 2019/0361916 | A1* | 11/2019 | Weaver | G06F 16/00 |
| 2021/0081432 | A1* | 3/2021 | Grunwald | G06F 11/1471 |
| 2022/0318218 | A1* | 10/2022 | Lin | G06F 16/2246 |
| 2023/0021150 | A1* | 1/2023 | VanBenschoten | G06F 16/273 |

OTHER PUBLICATIONS

"International Search Report and Written Opinion Issued in PCT Application No. PCT/US22/044313", Mailed Date: Dec. 6, 2022, 16 Pages.

"Submit Property Batch", Retrieved From: https://docs.microsoft.com/en-us/rest/api/servicefabric/sfclient-api-submitpropertybatch, Apr. 14, 2021, 5 Pages.

* cited by examiner

TRANSACTION LOG SERVICE WITH LOCAL LOG REPLICAS

BACKGROUND

A database may store large amounts of data in an accessible format. A database management system (DBMS) may be used to create and modify various tables of the database. For example, a DBMS may receive structured query language (SQL) commands from a user or application to perform database operations on the stored database.

A database may be implemented locally and/or using remote storage. A local database offers advantages such as speed. For example, a local solid state drive (SSD) may provide quick access to data stored anywhere in the database. A local database, however, may have limited size due to hardware constraints. Additionally, a local database may have limited availability if there are localized outages of services such as power or connectivity. A remote database provides greater scalability and availability than a local database, but access (particularly writing) to a remote database may be relatively slow compared to a local database.

A cloud architecture for a database may present similar issues even if the physical architecture is hidden from users. In particular, if a single machine or virtual machine is dedicated to a DBMS including both compute and storage for a local database, the size of the database may be limited. If the storage is remote from the compute function, the latency for write operations may be significantly greater. For example, one use case for a cloud database is online transactional processing (OLTP), which may be both read and write intensive. Traditional OLTP workloads, especially enterprise ones, are very sensitive to disk write latencies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some aspects, the techniques described herein relate to a network system for providing a database, including: a first server configured to host a compute service that is configured to: generate a transaction log for database actions, and commit at least a first portion of the transaction log to a log replica service; one or more second servers, each including one or more solid state drives (SSDs) and configured to host the log replica service that is configured to: replicate at least the first portion the transaction log to two or more local log replicas persisted on the SSDs of the one or more second servers, serve at least a second portion of the transaction log to a requesting service, and truncate the local log replicas by purging at least the second portion of the transaction log from the SSDs; a third server configured to host a page server service that is configured to: retrieve at least the second portion of the transaction log from one or more of the local log replicas, update database data in a remote storage based on at least the second portion of the transaction log retrieved from the one or more log replicas, and move at least the second portion of the transaction log to the remote storage.

In some implementations, the techniques described herein relate to a network system, wherein a latency to commit at least the first portion of the transaction log is less than 1.5 milliseconds.

In some implementations, the techniques described herein relate to a network system, wherein the two or more local log replicas are hosted in different availability zones.

In some implementations, the techniques described herein relate to a network system, wherein the log replica service is further configured to scale a number of the two or more local log replicas based on a workload.

In some implementations, the techniques described herein relate to a network system, wherein the log replica service is configured to truncate at least the second portion of the transaction log in response to the portion of the transaction log being moved to the remote storage and the portion of the transaction log not being marked active by one or more other services.

In some implementations, the techniques described herein relate to a network system, wherein the first portion of the transaction log is received at the log replica service as a new fixed size virtual log file.

In some implementations, the techniques described herein relate to a network system, wherein the log replica service is configured to select a start offset for the new virtual log file in the local log replica, the start offset being different than a start offset in a header of the first portion and selected to overwrite an old virtual log file in the local log replica that is not active, of the fixed size of the new virtual log file, of a different parity than the new virtual log file, and not marked for deferred truncation.

In some implementations, the techniques described herein relate to a network system, wherein the compute service is configured to flush the portion of the transaction log in response to an acknowledgment that the log replica service has committed the portion of the transaction log.

In some implementations, the techniques described herein relate to a network system, wherein one of the local log replicas is a primary log replica configured to receive the portion of the transaction log from the compute service and forward the portion of the transaction log to one or more secondary log replicas.

In another aspect, the techniques described herein relate to a method of database management, including: generating, by a compute service, a transaction log for database actions; writing the transaction log to a log replica service; replicating, by the log replica service, at least a portion of the transaction log to two or more local log replicas persisted on solid state drives; updating, by a page server service, database data in a remote storage based on the transaction log retrieved from at least one of the log replicas; moving at least the portion of the transaction log to the remote storage; and truncating the local log replicas by purging the portion.

In some implementations, the techniques described herein relate to a method, wherein a latency to commit at least the first portion of the transaction log is less than 1.5 milliseconds.

In some implementations, the techniques described herein relate to a method, wherein the two or more local log replicas are hosted in different availability zones.

In some implementations, the techniques described herein relate to a method, further including scaling a number of the two or more local log replicas based on a workload.

In some implementations, the techniques described herein relate to a method, further including truncating at least the second portion of the transaction log in response to the portion of the transaction log being moved to the remote storage and the portion of the transaction log not being marked active by one or more other services.

In some implementations, the techniques described herein relate to a method, wherein the first portion of the transaction log is received at the log replica service as a new fixed size virtual log file.

In some implementations, the techniques described herein relate to a method, wherein replicating at least the portion of the transaction log includes selecting a start offset for the new virtual log file in the local log replica, the start offset being different than a start offset in a header of the portion and selected to overwrite an old virtual log file in the local log replica that is not active, of the fixed size of the new virtual log file, of a different parity than the new virtual log file, and not marked for deferred truncation.

In some implementations, the techniques described herein relate to a method, further including flushing the portion of the transaction log in response to an acknowledgment that the log replica service has committed the portion of the transaction log.

In some implementations, the techniques described herein relate to a method, wherein one of the local log replicas is a primary log replica configured to receive the portion of the transaction log from the compute service and forward the portion of the transaction log to one or more secondary log replicas.

In some implementations, the techniques described herein relate to a non-transitory computer-readable medium storing computer-executable code for an instance of a log replica service to replicate transaction log files for a database service, including code to: receive at least a first portion of the transaction log from a compute service; replicate at least the first portion the transaction log to two or more local log replicas persisted on solid state drives (SSDs) one or more second instances of the log replica service; serve at least a second portion of the transaction log to a requesting service, and truncate the local log replicas by purging at least the second portion of the transaction log from the SSDs.

In another aspect, the techniques described herein relate to a non-transitory computer-readable medium, further including code to acknowledge to the compute service that the log replica service has committed the portion of the transaction log in response to a quorum among the instances of the log replica service.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
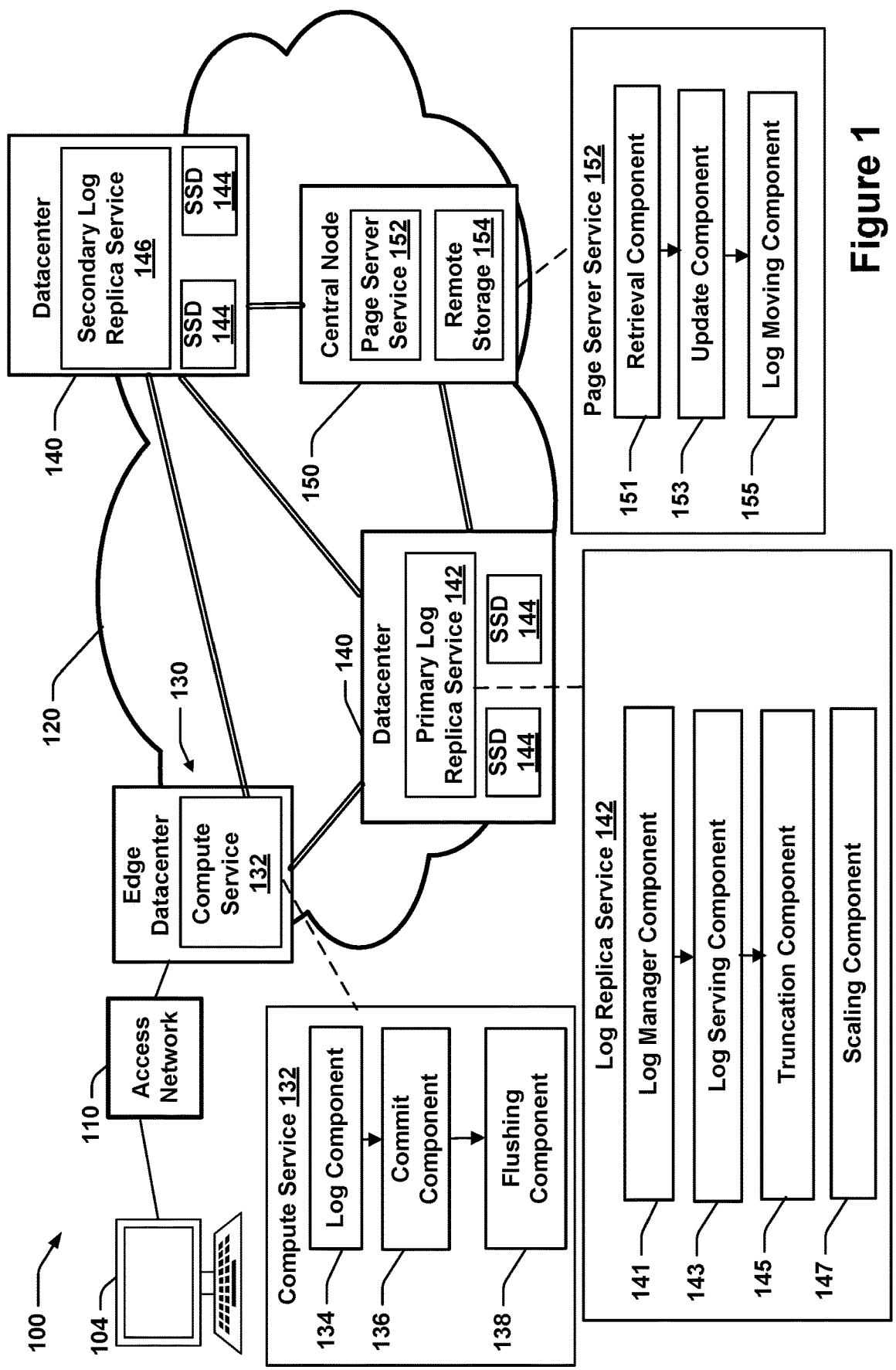
FIG. 1 is a conceptual diagram of an example of an architecture for a database service deployed in a network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes various examples related to providing a cloud database service including a transactional log with local log replicas. The cloud database service may be implemented using multiple services, which may be referred to as microservices. In particular, the cloud database service may include a compute service that performs database operations and generates a transaction log, a log replica service that replicates the transaction log, and a page service that stores the data for the database based on the log replicas. In an aspect, each of the services may be implemented on a different machine such as a server or virtual machine. The compute and storage of the database may be decoupled, which allows the maximum size of the database to increase beyond the limits of a local database. The log replicas may reduce the latency of write operations to a level that is on par with local databases.

A network system may provide the cloud database service. The network system may include a first server configured to host a compute service that is configured to generate a transaction log for database actions and commit at least a first portion of the transaction log to a log replica service. The log replica service may be implemented on one or more second servers, each including one or more solid state drives (SSDs) and configured to host the log replica service. The log replica service may be configured to replicate at least the first portion the transaction log to two or more local log replicas persisted on the SSDs of the one or more second servers, serve at least a second portion of the transaction log to a requesting service, and truncate the local log replicas by purging at least the second portion of the transaction log from the SSDs. A third server is configured to host a page server service that is configured to retrieve at least the second portion of the transaction log from one or more of the log replicas, update database data in a remote storage based on at least the second portion of the transaction log retrieved from the one or more log replicas, and move at least the second portion of the transaction log to the remote storage.

The compute service may send the transaction log to a highly available and durable log replica set. The log replica set may include local log replicas such as a primary log replica and one or more secondary log replicas. The log replica set may also include replicas spread across multiple availability zones. The log replicas persist the transaction log without a data file. Accordingly, the log replicas are light weight and resilient.

The database architecture including the log replicas speeds up write latency. For example, a commit latency may be reduced to 1.5 milliseconds (ms) or less. The reduced write latency allows a higher throughput of transactions. Additionally, the log service architecture including local log replicas makes the log service more resilient to failovers. For example, the local log replicas may replace a cached log, which is not persistent and can be lost of after failover or process restart. In some implementations, log replica service persists the logs across at least three availability-zones. The log replica services may be spread across upgrade domains and fault domains. When a log replica goes down, the remaining log replicas can continue to persist or serve logs without any performance impact. If the down replica comes back again, the logs on the SSD can be recovered and be used to serve actors immediately without the need to reload the transaction from the remote storage.

Further, the log replica service may be resilient to data storage outage. A data storage outage may block a conventional write process and cause user facing unavailability. The log replica service does not have direct dependency on the data storage as the tail of logs are persisted on the local SSD of the resources assigned to the log replica service. If the data storage is out, the log replica service may not be able to destage portions of the transaction log, but the outage may not have a direct impact on the user facing availability.

The log replica service may simplify the log tiers for large scale databases. For the existing architectures, portions of the logs may be located both at the compute service and the data storage and various sophisticated logic may be used to synchronize the records. In the log replica service approach, the log replica service is the single logical entity for the tail of logs, so logic to synchronize multiple versions is not necessary.

The log replica service may enable a low latency, low cost, multiple availability zone solution for large scale databases. Multiple availability zones can be enabled by simply deploying the log replicas on a multiple availability zone tenant ring. In contrast, existing systems that require co-location of the compute and storage functions may not allow operation in different availability zones. Finally, the log replica service may be scalable. For example, the number of log replicas may be increased as the workload increases.

Figure 4A:
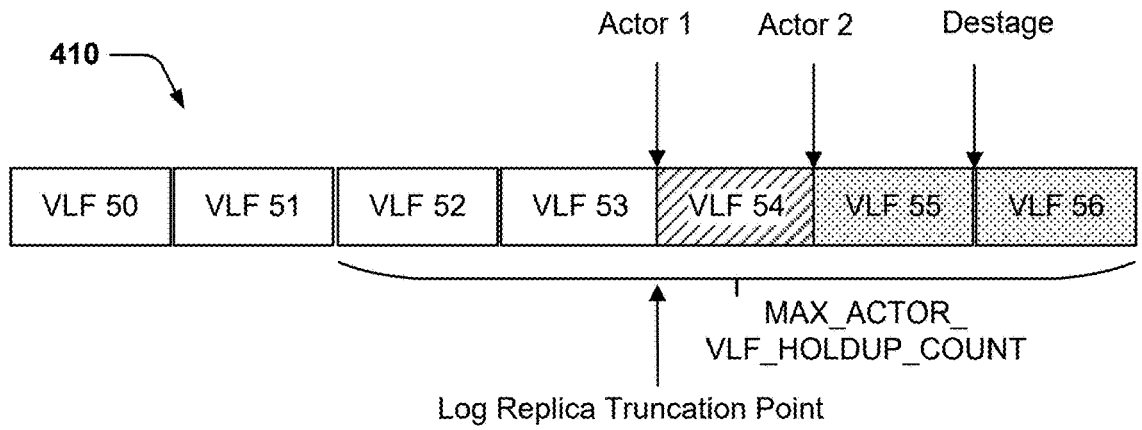
FIGS. 4A, 4B, and 4C are diagrams of log replicas undergoing truncation.
Figure 4B:
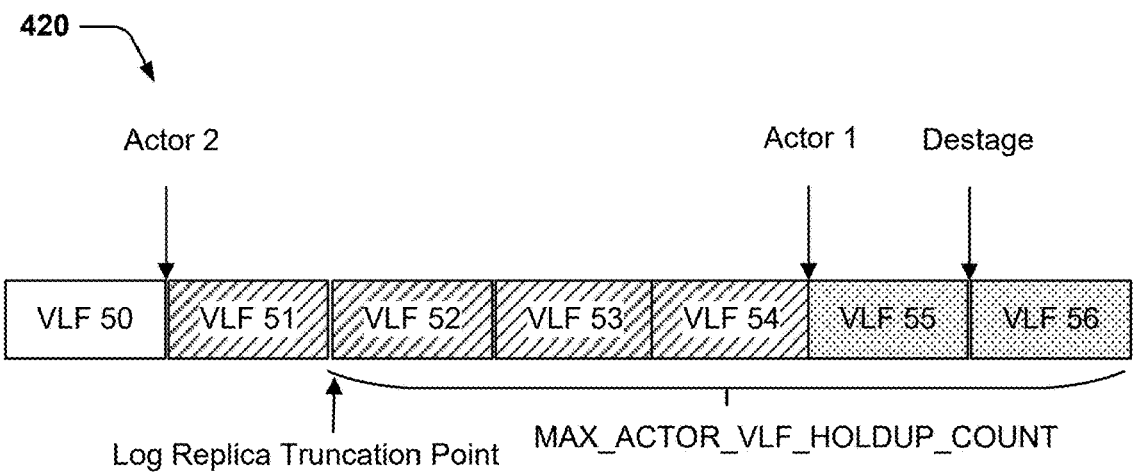
Figure 4C:
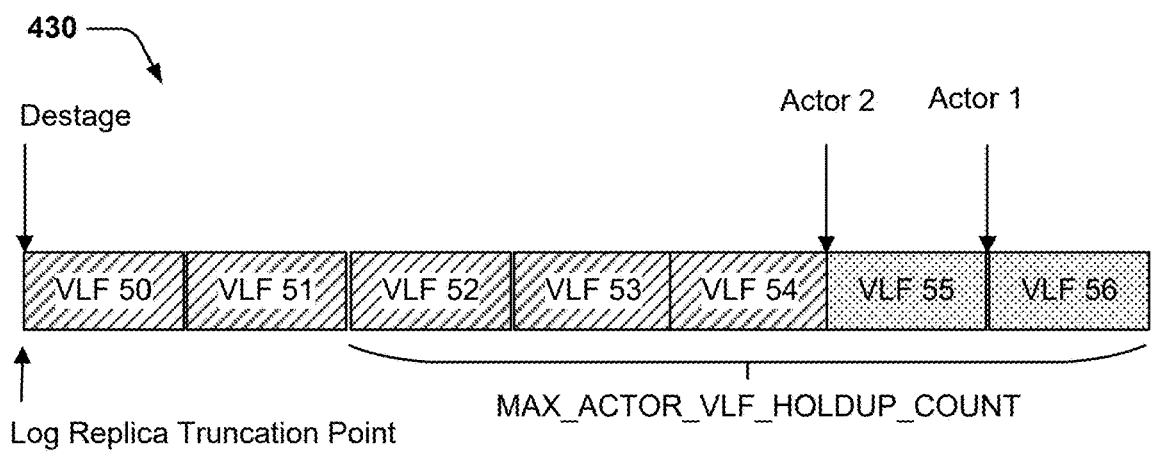
Figure 5:
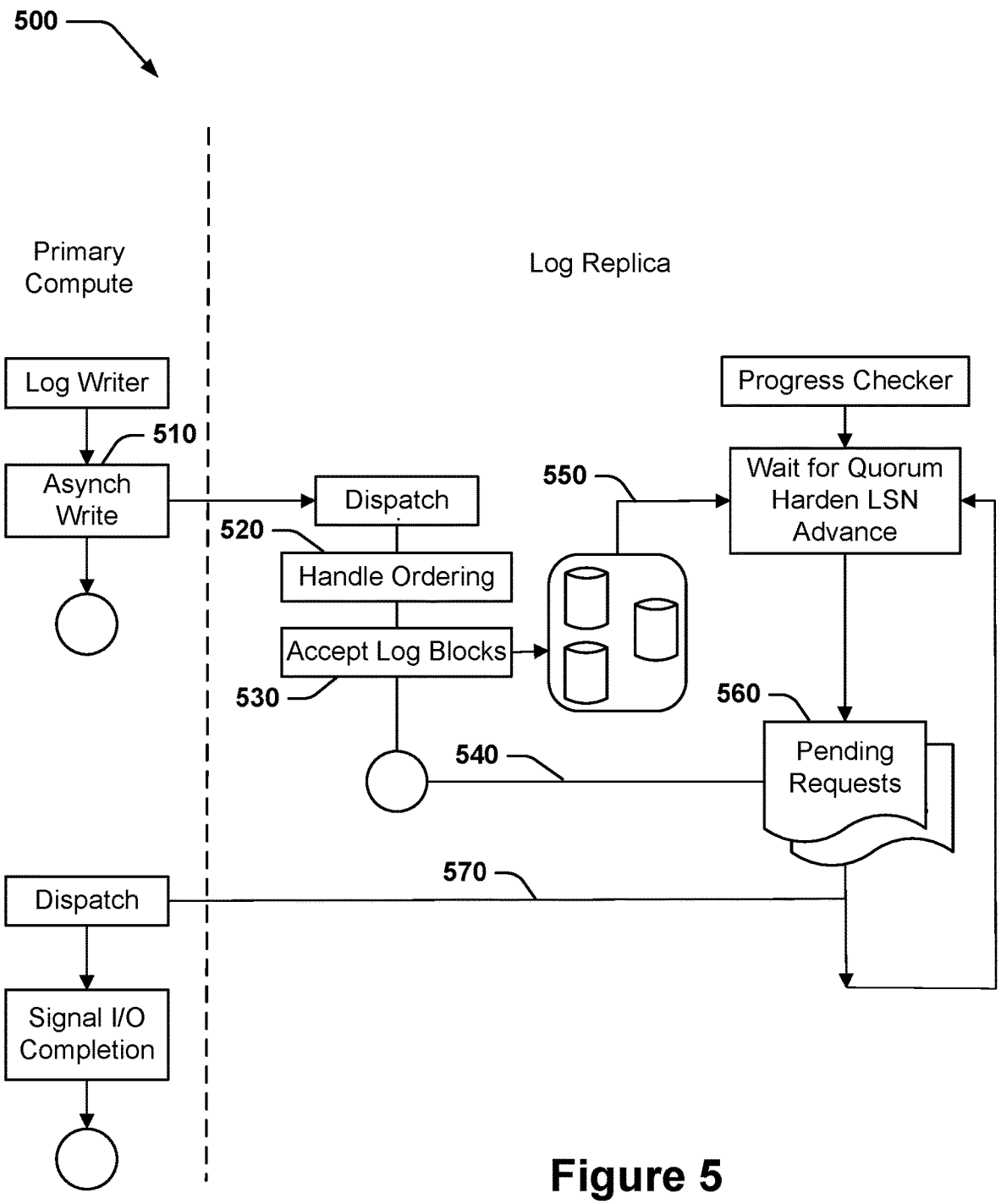
FIG. 5 is a flow diagram of the log write path for a primary compute service and a log replica service.
Figure 6:
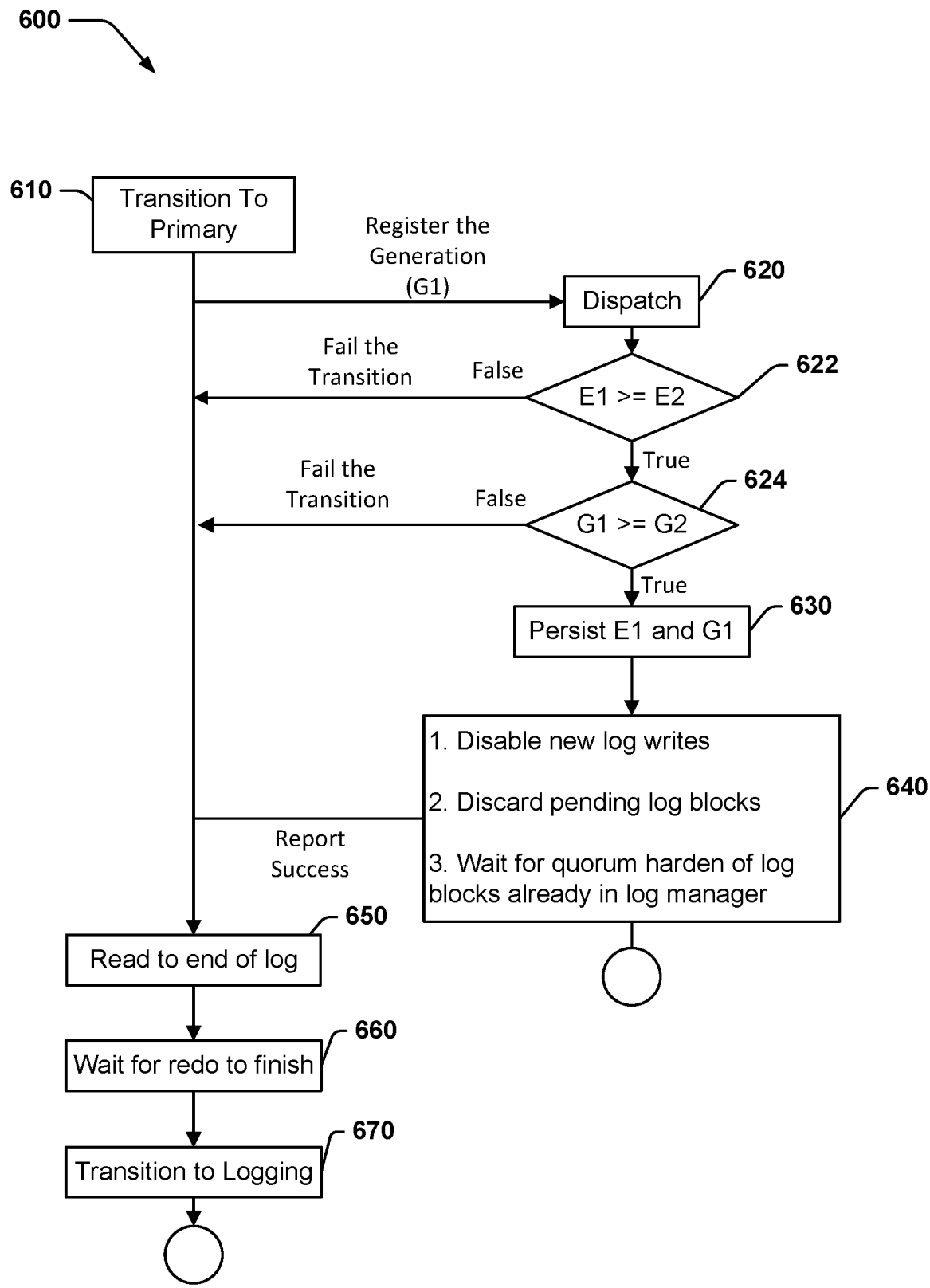
FIG. 6 is a flow diagram illustrating an example of an initial generation registration step when a compute instance is transitioning to a primary role.

Turning now to FIGS. 1-7, examples are depicted with reference to one or more components and one or more methods that may perform the actions or operations described herein, where components and/or actions/operations in dashed line may be optional. Although the operations described below in FIG. 6 are presented in a particular order and/or as being performed by an example component, the ordering of the actions and the components performing the actions may be varied, in some examples, depending on the implementation. Moreover, in some examples, one or more of the actions, functions, and/or described components may be performed by a specially-programmed processor, a processor executing specially-programmed software or computer-readable media, or by any other combination of a hardware component and/or a software component capable of performing the described actions or functions.

FIG. 1 is a conceptual diagram of an example of a system 100 for a database service deployed in a network 120. The network 120 may be, for example, a wide area network (WAN). The network 120 may be connected to other networks such as an access network 110 to provide services to devices 104. For example, the database service may be an application that includes multiple microservices. Each microservice may be deployed as multiple instances of the microservice that execute on computing resources of the network 120. For example, a microservice that provides a user interface of the application to user devices 104 (e.g., a compute service 132) may be instantiated on an edge datacenters 130. An edge datacenter 130 may include peering connections to other networks (e.g., access network 110). In contrast, a central node 150 that includes, for example, a page server service 152 and/or remote storage 154 may reside at a central datacenter. A datacenter may include one or more hardware computer servers. In some implementations, the hardware computer servers may host virtual machines (VMs), which in turn host services.

For example, the datacenter 130 may host a compute service 132 configured to perform database operations. For example, the compute service 132 may receive database commands from a user device 104 and/or network applications, which may be referred to as actors. The compute service 132 may include a log component 134 configured to generate a transaction log for database actions. The compute service 132 may include a commit component 136 configured to commit at least a first portion of the transaction log to a log replica service. In some implementations, the compute service 132 may include a flushing component 138 configured to flush the portion of the transaction log in response to an acknowledgment that the log replica service has committed the portion of the transaction log.

As another example, a datacenter 140 may include a log replica service 142 configured to persist at least a portion of the transaction log. Multiple instances of the log replica service 142 may be instantiated at different datacenters 140 and/or different hardware servers. For example, the instances may include a primary log replica service 142 and a secondary log replica 146. The servers hosting the instances of the log replica service 142 may be located in different availability zones. The servers hosting the instances of the log replica service 142 may include solid state drives (SSDs) 144 for storing at least a portion of the log replica. The log replica service 142 may include a log manager component 141 configured to replicate at least the first portion the transaction log to two or more local log replicas persisted on the SSDs 144 of the one or more second servers. The log replica service 142 may include a log serving component 143 configured to serve at least a second portion of the transaction log to a requesting service. The log replica service 142 may include a truncation component 145 configured to truncate the local log replicas by purging at least the second portion of the transaction log from the SSDs. In some implementations, the log replica service may include a scaling component 147 configured to scale a number of the two or more local log replicas based on a workload.

The page server service 152 may be configured to update database data and a transaction log in remote storage 154. The page server service 152 may include a retrieval component 151 configured to retrieve at least the second portion of the transaction log from one or more of the log replicas. The page server service 152 may include an update component 153 configured to update database data in the remote storage 154 based on at least the second portion of the transaction log retrieved from the one or more local log replicas. The page server service 152 may include a log moving component 155 configured to move at least the second portion of the transaction log to the remote storage.

Figure 2:
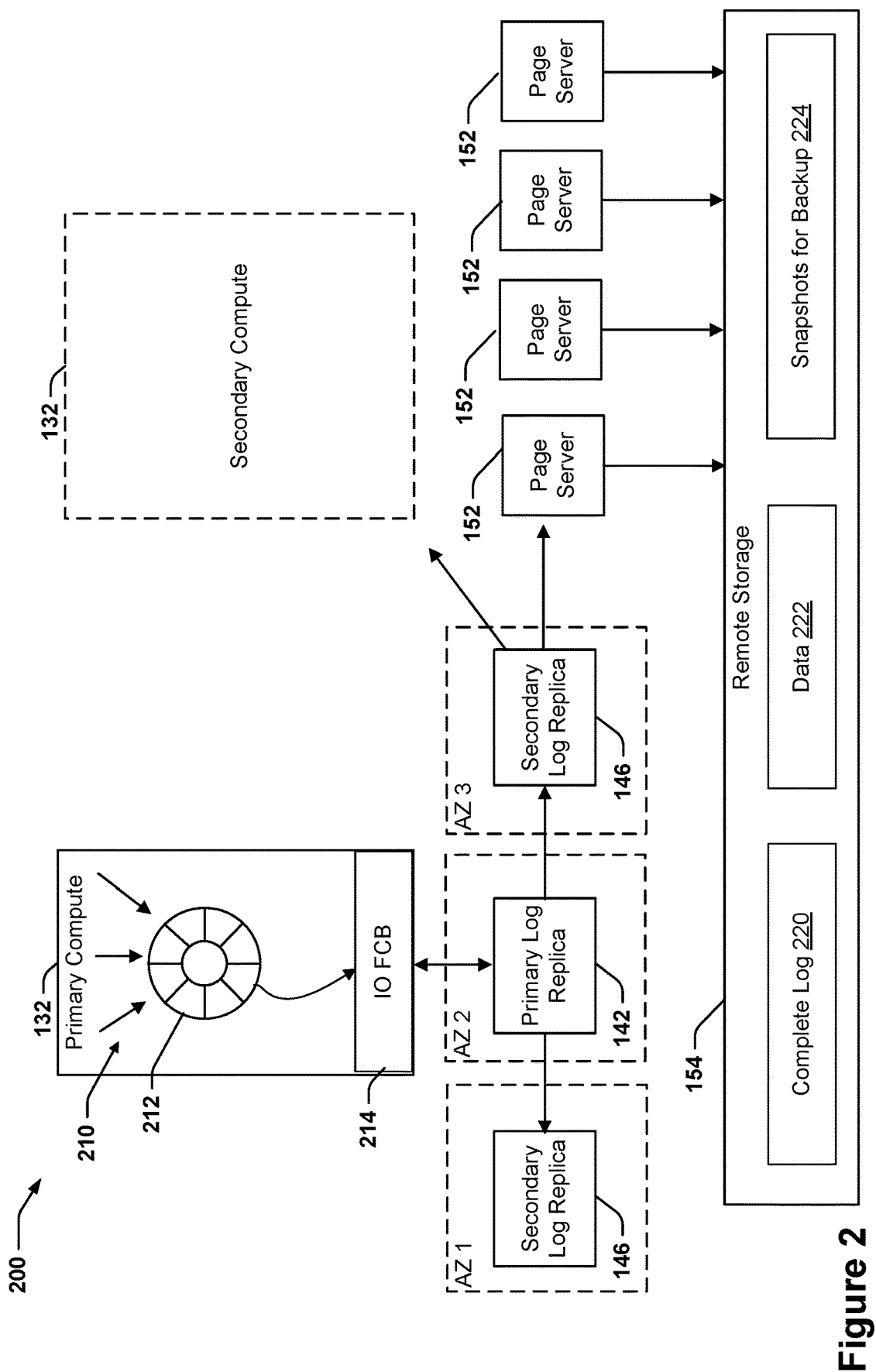
FIG. 2 is a diagram of a database application including data flows among various services.

FIG. 2 is a diagram of a database application 200 including data flows among various services. The database application 200 may include a primary compute service 132, the log replica service 142, the page server service 152, and the remote storage 154.

A primary compute service 132 may receive database commands 210 from various actors such as users or applications. The primary compute service 132 may process the database commands to generate a transaction log 212 for database actions. For example, the transaction log 212 may be stored locally at the primary compute service 132 as cache, which may be implemented as a circular queue. When the primary compute service 132 finishes a batch of database commands delimited by a commit command, the primary compute service 132 may commit a portion of the transaction log 212 to the primary log replica service 142.

From the perspective of the primary compute service 132, the log replica service 142 is just a log input/output (IO) device such as a file control block (FCB) (IO FCB 214) below the FCB layer. The primary compute service 132 writes log blocks. When the IO FCB 214 receives log block writes from an upper layer log writer, the IO FCB 214 will send the log blocks to the log replica service 142 via an IO connection. Once the primary compute service 132 receives the acknowledgement from the log replica service 142 that these log blocks have been persisted on the log replica service side, these log blocks will be treated as successfully flushed. Subsequent reads to these written log blocks will also go to the log replica service 142.

In some implementations, the log replica service 142 can be a local storage database with only log files. The log replica service 142 may have one primary replica and multiple secondary replicas 146. The log replica service 142 may use a shared nothing architecture (SNA) to manage its own quorum and replication. When the primary log replica 142 receives a log block from the compute service 132, the primary log replica 142 will forward the log blocks to the secondary log replicas 146 as well as flushing the log blocks locally on its local log file. The primary log replica 142 will acknowledge back to the primary compute service 132 once related log blocks have been quorum hardened. In the background, the log replica service 142 will also feed quorum committed log blocks to the log serving component 143 for serving other actors and the truncation component 145 for destaging and truncation. Logs that have been destaged can be truncated on the log replica. Optionally, the primary log replica 142 can hold up log truncation for lagging actors.

The log replica service 142 is different from a regular local storage database in the following ways. The log replica service 142 does not have any real database files. The log replica service 142 contains only a log file (ldf) to host the tail of the transaction log 212 of the compute service 132, and a boot page to persist necessary metadata. All the replicas 142, 146, including the primary replica 142, operate in log accept mode. There is no redo on a log replica. The log replica service 142 hosts the tail of the infinite log stream instead of mirroring a log file of a user database. The log replica service 142 acts as the fast log persistence device as well as the cache for serving log files to other actors or services.

The log replica service 142 is the single logical entity hosting the tail of the transaction log. The log replica services does not utilize synchronized versions. This simplifies the log tiers for large scale databases as no logic is necessary to synchronize different versions. The log replica service 142 has lower write latency, for example, due to the use of local SSDs. The log file on the log replica service 142 can be grown and shrunk on demand instead of fixed size. The log file on the local SSDs 144 is recoverable, while synchronized versions may require re-seeding. Further, the log replica service 142 is more resilient to outage of the remote storage 154 as log replica service 142 does not have any dependency for log write and read (for virtual log files (VLFs) hosted on log replica).

The remote storage 154 may include a complete log 220, data 222, and snapshots for backup 224. The remote storage 154 may build the complete log 220 from the portions of the transaction log 212 received via the page server service 152. Unlike the log replicas 142, 146, the complete log 220 does not destage or purge any portion of the transaction log. The remote storage 154 also includes the data 222 for the database. The page server service 152 may replay the logs from the log replica service 142 to generate and update the data 222. The remote storage 154 may generate the snapshots for backup 224 based on the complete log 220 and the data 222.

Figure 3A:
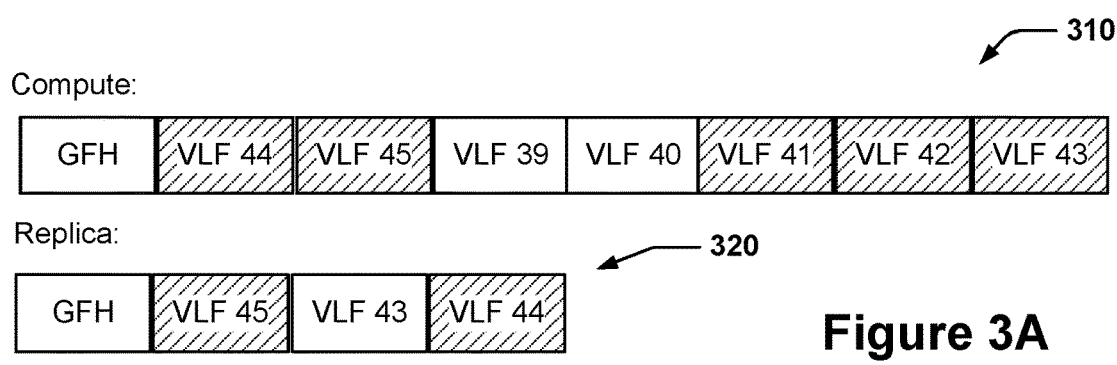
FIGS. 3A, 3B, 3C, and 3D are diagrams of example log files at a compute service and at a log replica service.

FIG. 3A is a diagram of example log files at the compute service and at the log replica service. A log replica may use a standard SQL server log file format to host the tail of the infinite log stream generated by the compute service. The semantics of the SQL server log file format related to virtual log files (VLFs) and a start offset may be modified.

A physical log file contains a general file header (GFH) and a number of virtual log files (VLF). A VLF header data structure may include the following fields: lfh_fixedValue—a fixed value to detect sector remapping; lfh_parity—a parity for the file; lfh_versionNo a version number for log file format; lfh_fSeqNo—a log file sequence number; lfh_status—status bits; lfh_writeSeqNo—a counter incremented for each write; lfh_fileSize—a size of the file; lfh_startOffset—an offset of the header from start of file; lfh_createLSN—a LSN at the time of LFCB creation; lfh_DEK [x_cbCSECDEKStorageSizeReadOnly]—a DEK used to encrypt this logical file.

When the log replica service 142 receives a new log file header from the primary compute service 132, the fh_startOffset describes the start offset of that VLF on the primary compute service 132. Instead of mirroring log layout of the compute service 132 by laying down the VLF on the physical offset described in lfh_startOffset, the log replica service 142 may decide the placement of that VLF. The placement logic will try to place the accepting VLF on a VLF that is: 1) Not active or lazily active (a still active VLF cannot be overwritten); 2) Of the same size as the new log file (always true if fixed size VLF is used); 3) Of different parity (for detection of end of log by detecting parity flip); and 4) Not in a portion marked for deferred truncation.

If such VLF is not found, the log replica service will grow the ldf to place the new log file in a new accepting VLF. As a result, the VLF is likely be placed on a physical offset different than lfh_startOffset in the log file header. The reason why the log replica service 142 does not mirror VLF layout of the compute service 132 is that the log replica service 142 just hosts the tail of the infinite log stream. The log file size of the log replica service 142 can be smaller or larger than the compute's log file size.

In FIG. 3A, the log file of the compute service 132 is larger than the log of the log replica service 142. For example, there may be a large active non-CTR transaction running on the compute service 132 holding up log on VLF 41. Hatched fill indicates the VLF is still active. In the log replica service 142, VLFs before VLF 44 have been destaged to remote storage.

Figure 3B:
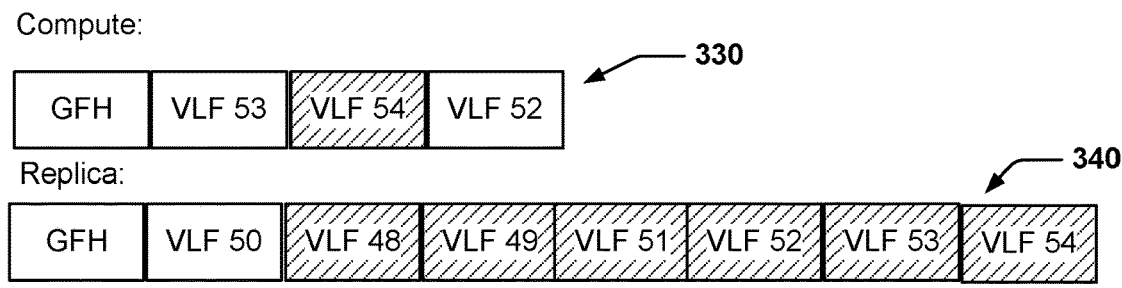

FIG. 3B is a diagram of example log files at the compute service and at the log replica service. In this example, the log 330 of the compute service 132 is smaller than the log 340 of the log replica service. For instance, this scenario may occur when the remote storage 154 is down and the log replica service 142 destaging/truncating is stuck at VLF 48. The log 340 at the log replica service 142 may continue to grow even as the compute service 132 may flush committed VLFs.

Because the log replica service 142 can place a VLF on a physical location different than the compute service 132, the log manager component 141 tracks the following two start offsets in a single VLF: the physical start offset of the VLF on the log replica (host start offset) and the start offset of the VLF on the compute service 132 side (guest start offset). The meaning of host start offset is internal to the log replica itself and it is used by log replica to manage its physical log space. The guest start offset information is useful for communication with the compute service 132, but not useful for the internal space management of the log replica.

The on-disk data structure, LogFileHdr, may include a single field for the start offset. To handle this, the log replica service 142 may only persist the guest start offset on that start offset field on disk, so that the existing log file format does not change. For space management of the internal log (host start offset), the log replica service 142 may also maintain an in-memory value for the host start offset in log file control block (LFCB). The log replica service 142 may not persist the host start offset because the log replica service 142 can always reconstruct a host start offset by scanning the log file during database startup, file growth, or shrink.

Figure 3C:
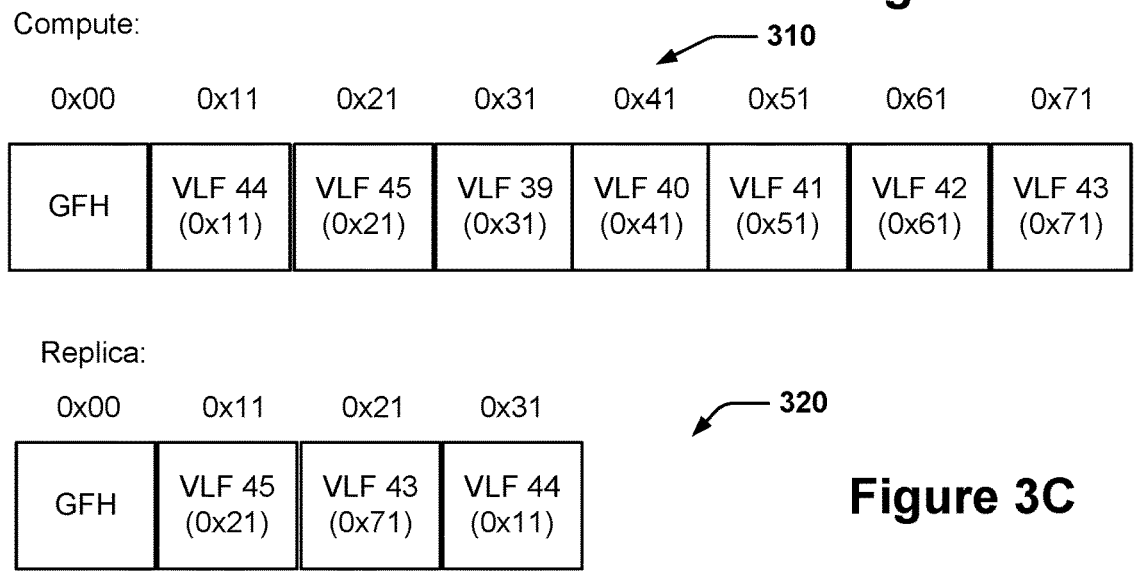

FIG. 3C is diagram of example logs with VLF offsets at the compute service and the log replica service. The offset above each VLF is the physical offset in the ldf file (i.e. host start offset) while the offset inside the VLF is the start offset persisted in the VLF header (i.e. guest start offset). The log 310 at the compute service 142 may correspond to the log 310 in FIG. 3A and the log 320 at the compute service 142 may correspond to the log 320 in FIG. 3A.

Internally, the log replica service 142 may always use the host start offset. However, when sending the LogFileHdr to the external components/services such as the compute service 132, page server service 152, or secondary log replicas 146, the log replica service 142 will use the guest offset in the start offset field, as the host start offset is only meaningful to the log replica itself.

The following scenarios may involve the initial bootstrap of the log replica service 142: initial database creation, forward migration from a local database to a large scale database, migration from a remote storage based database to log replica based database, point in time restore (PITR). When a new log replica service 142 is created, the primary replica 142 will first be started. In case of PITR or migration from remote storage based database to log replica based database, the new log replica service 142 will copy log GFH and the right portion of the last VLF from long term storage to its local SSD to construct a local ldf file. In case of initial creation or forward migration (while nothing is destaged to long term storage yet), the new log replica service 142 will copy the log GFH and active VLFs from a seed database its local SSD to construct a log ldf file. After that, the log replica primary 142 will attach to the ldf file in log accept mode and start up. Then it will seed its local secondary log replicas 146 and become available after local seeding is finished.

After attaching to the log files in the initial bootstrap or during a restart, the log replica should be able to come up in a consistent state and be ready to accept new logs. The following are the sequences for log replica startup: 1. Load the DBInfo from bootpage. DBInfo contains the metadata needed for database startup; 2. Open the log file. 3. Build up a VLF map by scanning the VLF headers; and 4. Scan from the first record in the 'truncation VLF' all the way to the end of logs to initialize log manager. The end of log will be detected here and startup can finish. As discussed above, the log replica service 142 may map a VLF id to a host Start Offset and a guest Start Offset. The host Start Offset is the physical scan location of the VLF header, and the guest Start Offset is from the start Offset field in the header. There may be no analysis or redo phase in the log replica startup. If the secondary log replica was ahead of the current primary replica before the crash/restart, there will be an extra step to snip the extra logs before the secondary log replica can join the replica set.

Log replica seeding is used to create new secondary log replica from existing primary log replica. There are two options for local seeding: use streaming backup/restore or copy some portion of the log file from log replica primary, attach to the log file, and then catchup with the primary. The second approach is similar to initial bootstrap. For log replica local seeding based on streaming backup restore, the secondary log replica will take a copy of only a "full" backup on the log replica primary, and restore on the secondary replica. The full backup and restore here will only involve bootpage and log files, as there is nothing else on the primary log replica. For example, the media recovery of the restore will be skipped as there are not any real pages of data for media redo.

Log replica backup/restore may also account for the start Offset in VLF header being different from its physical location. As discussed above, the log replica service 142 may track a host start offset and a guest start offset. The log replica service 142 may include both the host start Offset and the guest start offset for each VLF in the backup set, and instruct a restore operation to put the VLF on same location as primary log replica while keeping the host start offset on the VLF header. In the backup set, the metadata for each VLF is described in MTF_MSTL, which contains m_log_header to describe the VLF header, as well as m_starting_offset and m_ending_offset to describe the range of logs in the VLF that is backed up. The log replica service may use the m_log_header.m_offset to describe log replica primary's physical offset, while use m_starting_offset and m_ending_offset to describe the range of logs to back up in terms of the offset of the compute service 132. Since the log replica always truncates at the VLF boundary, the log replica service 142 can simply deduce the start Offset of the compute service 132 as (m_starting_offset–MIN_OFFSET_IN_FILE). Alternatively, the log replica service 142 can deduce the start Offset of the compute service 132 as (m_starting_offset–(m_starting_offset–GFHSize) % VLFSize), as the VLF Size is fixed for a large scale database. In addition, the log replica service 142 can easily convert an offset with a VLF between log replica and compute once the start offsets from both sides are known.

Figure 3D:
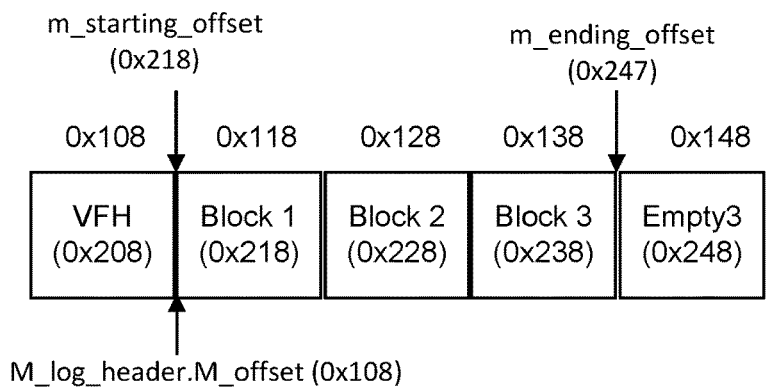

FIG. 3D illustrates an example of deducing start offsets. The fields m_starting_offset, m_ending_offset, and m_log_header.m_offset are in the MTF_MSTL that the restore function receives. The host VLF start Offset may be set to the value 0x108 equal to m_log_header.m_offset. The guest VLF start offset may be deduced from the value 0x218 of m_starting_offset minus the value 0x10 of MIN_OFFSET_

IN_FILE. The MIN_OFFSET_IN_FILE may be calculated as (m_starting_offset (0x218)−GFHSize (0x8)) % VLFSize (50).

The log replica service 142 manages its own truncation. The log replica service 142 holds up the VLFs that have not been destaged yet. Optionally, the log replica service 142 can also hold up the logs for lagging actors so that the lagging actor will not have to retrieve logs from the remote storage 154. The log replica service 142 always truncates on the VLF boundary to be consistent with the lease service. Because the log replica service 142 also hosts the log serving component 143 in the same process, the log replica service 142 can easily retrieve the truncation information from lease service.

The truncation point for log replica is defined as: [truncation VLF]=MIN ([destage VLF], [actor holdup VLF]). The parameter [destage VLF] is the lowest index VLF that has not been destaged yet. The parameter [actor holdup VLF] is defined as MAX (MIN ([actor VLF]), ([latest VLF]−MAX_ACTOR_VLF_HOLDUP_COUNT)). MAX_ACTOR_VLF_HOLDUP_COUNT is the maximum number of VLFs to be held up for lagging actors. MAX_ACTOR_VLF_HOLDUP_COUNT is defined to prevent VLF holdup for actors going unbounded.

FIG. 4A illustrates an example of truncation of a log 410 bounded by a lagging actor. For example, the destage operation may have received an acknowledgment that VLF 55 has been read to remote storage 154, but actor 1 may be accessing VLF 54 and actor 2 may be accessing VLF 55. The number of held up VLFs is less than the MAX_ACTOR_VLF_HOLDUP_COUNT. Accordingly, the log replica service 142 may truncate the log 410 up to VLF 53.

FIG. 4B illustrates an example of truncation of a log 420 bounded by MAX_ACTOR_VLF_HOLDUP_COUNT. For example, the destage operation may have received an acknowledgment that VLF 55 has been read to remote storage 154, but actor 1 may be accessing VLF 54 and actor 2 may be accessing VLF 51. The number of held up VLFs (56−51) may be greater than the MAX_ACTOR_VLF_HOLDUP_COUNT. Accordingly, the log replica service 142 may truncate the log 420 up to VLF 52 based on the MAX_ACTOR_VLF_HOLDUP_COUNT. If actor 2 attempts to read VLF 51, the request will go to remote storage 154.

FIG. 4C illustrates an example of truncation of a log 430 bounded by destaging. For example, the destage operation may be at VLF 50, for example, because the remote storage 154 is down. Even though actor 1 may be accessing VLF 56 and actor 2 may be accessing VLF 55, the log replica service 142 cannot destage the VLFs that have not been moved to the remote storage 154. The local log file representing the log 430 of the log replica service 142 can temporally grow very large due to the remote storage outage. When the issue holding up the log goes away and the condition is stabilized, each log replica can optimistically shrink its own log file to minimize the on-disk footprint. For example, in some implementations, the log replica service 142 may initially have 3 VLFs. To make the space management more flexible, the fixed VLF size can be relatively small, e.g., 1 GB or less.

To support an elastic resource pool and managed instances in a cost efficient way, multiple log replica services 142 may share the same resource pool. Since a log replica service is essentially a database with only log file, an elastic pool can host multiple log replica services in a single SQL app. Each log replica service will manage a separate log stream of a single database in an elastic pool or managed instance.

With the log replica service 142, the write/read to log files for the compute service 132 will still go through IO FCB 214, so layers above FCB layers in the compute service 132 may remain unchanged. Below the IO FCB 214, the log write will be persisted on the log replica service 142. Log read will still go through the log serving component 143 and remain unchanged on the compute service 132.

FIG. 5 illustrates the log write path 500 for a primary compute service 132 with a log replica service 142. At 510, the Log Writer thread issues an AsyncWrite command to the IO FCB 214, which sends the log block to the primary log replica 142 via the IO connection. At 520, when the primary log replica receives the block in a dispatch, the primary log replica 142 will insert the log block into a sequence map and check if there are any continuous log blocks that can be pushed into the log manager component 141 because the log manager does not handle out of order log blocks in log accept mode. If there is still a gap between the current block serial number (BSN) of the primary log replica and the last BSN accepted by the log manager, the primary log replica will simply exit. At 530, the primary log replica 142 may push continuous log block(s) from the sequence map into the log manager component 141 via an AcceptLogBlocks/AcceptNextVLF command. Once the log blocks are pushed into the log manager component 141, the primary log replica will be automatically replicated to secondary replicas as well as flushed locally. At 540, the dispatch thread will then push the requests associated with pushed blocks into pending request queues and exit. The primary log replica 142 does not wait for the quorum harden in the dispatch thread to respond as the threads are limited. At 550, as long as the quorum harden BSN on the log replica advances, the primary log replica will signal a dedicated progress checker thread. At 560, the progress checker thread will then check the quorum harden BSN and find requests with BSN smaller or equal than that BSN. At 570, the primary log replica will then send responses to these success requests back to the primary compute. In some implementations, these responses can be consolidated into a single response with quorum harden BSN. When the primary compute receives the response(s), it will signal I/O completions to the log write I/Os associated with the requests. The IO transport on the compute side will automatically retry if there is no response from log replica after certain amount of time.

To prevent multiple compute replicas trying to write to the log replica service at the same time (either due to bug, race condition or zombie compute), only the latest global primary compute can write to the log replica service. All the write requests from other compute instances will fail. Writes to an invalid primary log replica may also be blocked. The quorum commit protocol ensures new log writes can only succeed in a valid primary replica.

To allow only the latest global primary compute instance to write to the log replica service, the basic idea is to maintain an ever-increasing generation number on the log replica service. Every time a compute instance becomes primary, the new primary compute service will register a new generation number with the log replica service. The registration can only succeed if the new generation is equal or larger than the existing generation on the log replica service. The primary compute will include the generation in every write request. Only write requests matching the current generation on log replica can succeed, and write requests with mismatched generation will be failed immediately by log replica service.

FIG. 6 is a flow diagram 600 illustrating an example of an initial generation registration step when a compute instance is transitioning to primary.

At 610, before a new primary compute instance transitions to logging mode to generate any new logs, the new primary compute instance will send its generation on the log replica service (via a special IO message). The generation of a compute instance can be defined as: [AppOrderId]-[EpochNumber]-[LastRestartTime]. A service fabric guarantees that whenever there is primary change, the epoch number will always increase. The AppOrderId is mainly used for an Update SLO scenario, and the target instance will have a higher AppOrderId than the source instance. In the same app, the AppOrderId is always the same. LastRestartTime will be increased in every primary restart.

At 620, when receiving the generation message, the primary log replica will try to persist the generation message on the following fabric property upon receiving the request: ([Current Compute Generation], [Log Replica Epoch]). The primary log replica can only persist the generation when: The generation the primary log replica received is equal or larger than [Current Compute Generation] at 624 and the log replica's own epoch is equal or larger than [Log Replica Epoch] at 622. The comparison to [Current Compute Generation] prevents a stale primary replica from writing to the log replica. If the received generation is smaller than the [Current Compute Generation], that means the compute sending the registration request is stale. The log replica service will simply send a failed request to that compute service instance indicating that the compute service instance is a stale primary instance. The compute service instance receiving such failed request can simply report fault to service fabric. This prevents stale log replica primary from updating the fabric property. If the epoch of the log replica is smaller than the [Log Replica Epoch], the log replica can simply report fault to service fabric as the log replica is a stale primary log replica. Since it is possible to perform a write-after-read, there is a possible race in which another stale primary compute service instance (B) reads the fabric property before the current primary compute instance (A) updates the fabric property, and the stale primary compute service instance (B) updates the fabric property after the current primary compute instance (A) updates the fabric property. To prevent such races, the fabric property read and write may be performed in a single atomic operation, or a stale primary may be prevented from writing to the generation fabric property. For example, the primary log replica service may do a live quorum check before and after updating the generation fabric property. Alternatively, the submit property batch API of the service fabric may be used to do read and write in a transactional manner.

At 630, the primary log replica may persist the compute generation and the log replica epoch as fabric properties. Once the compute generation is persisted successfully, the compute generation will be also cached in memory so that the log replica service does not need to read the compute generation from the fabric property repeatedly. The compute generation is persisted in the fabric property so that the current generation will not be lost during failover or replica restart.

At 640, the primary log replica may disable any new log writes from the old primary compute service instance. The primary log replica may discard any pending log blocks with generation smaller than that pending generation. The primary log replica may wait for the other log replicas to quorum harden log blocks already in the log manager. The primary log replica may report success to the new primary compute service instance.

In regular circumstances, only the current primary log replica can update the generation fabric property and the cached generation value will be up-to-date. If a new log replica is elected as a new primary log replica, the existing primary log replica will first be demoted and will not try to accept logs from the compute service anymore. The new primary log replica will load the existing generation from the fabric property and begin to accept new logs. However, it is possible a primary log replica became a zombie/stale primary and a new log replica with a higher epoch comes up and updates the generation fabric property without the zombie primary knowing it. This is OK because a zombie primary cannot quorum harden any new logs.

At 650, the new primary compute service instance will then sync with the log replica primary to read the end of the log. At 660, the new primary compute service will redo up to the end of logs. At 670, the new primary compute service instance will finish transition to primary and be ready to generate new logs.

Any log write requests to the log replica service will have a field indicating the generation of the sending compute service instance. If the primary log replica receives a write log request with a different generation than its existing generation, the primary log replica will simply fail the request. As an extra layer of protection, the response to the primary compute service instance for writing the log also contains the generation information. Upon receiving the response, the compute service instance will check if that generation matches its own. The receiving side will treat the request as failed if the generation does not match.

The primary log replica can fail over to a different node due to planned deployment, load balancing event, or unplanned failure independent of compute. Any log blocks that have been acknowledged back to compute are guaranteed to be persisted on the new log replica primary based on the following two facts: 1) Log replica service only acknowledges back quorum hardened log blocks to compute and 2) Service Fabric is guaranteed to elect a secondary log replica containing all the quorum harden blocks as the new primary log replica. Before the write status of the new primary is granted and is able to serve new write requests, the new primary log replica will make sure all its local blocks are quorum hardened on the existing replica set. For the log blocks that the primary compute service instance has not received acknowledges before the failover, the RBIO communication library will transparently retry sending these log blocks. The retried request will be eventually directed to the new primary. As a result, log replica failover will manifest as log WRITELOG wait instead of unavailability to the end user.

There are in general 2 cases for these unacknowledged log blocks. 1) The unacknowledged log block BSN is larger than the quorum hardened BSN of the new primary log replica. This can happen when the old log replica primary crashed before the log block is transmitted to or harden on this secondary replica at that time. In this case, the retried request will go through the same RBIO path and the compute will receive the acknowledge once that log block is quorum hardened. 2) The unacknowledged log block BSN is equal or less than the quorum harden BSN of the new primary log replica. This can happen when the old log replica primary crashed after the log block is hardened on this secondary replica, but before the quorum hardened acknowledge is sent back to the primary compute. When the new primary log replica receives such a request, the new primary log replica will validate that the log block content is the same as the previous received one, and acknowledge the success of that request immediately back to the compute service.

It is also possible that these retry requests initially land on the old primary log replica. There are in general three cases to consider. First, the old primary log replica may still be down or unavailable for requests. In this case the request will simply fail or time out. The compute service will simply retry the request. Second, the old primary log replica may now be a healthy secondary replica. If the log replica is a secondary, the log replica will immediately fail any write requests and the compute service will retry. Third, the old primary log replica may now be a "zombie primary". The replica itself thinks that it is still a valid primary, while the zombie primary is down from the Service Fabric perspective. For any log write requests beyond the quorum hardened BSN of the zombie primary, the zombie primary simply cannot quorum commit because other secondary log replicas will simply reject the logs due to a stale epoch number. The write request will fail or time out, and the compute will retry the request. For log write requests equal or smaller than the quorum hardened BSN, the zombie log replica primary will simply send success responses to these requests. This is OK because these quorum hardened log blocks must have been hardened on the valid new primary based on quorum commit protocol and the leader election logic of the service fabric. To sum up, the request on the old primary will either fail and trigger a retry, or succeed, but there is no correctness issue in any case.

Figure 7:
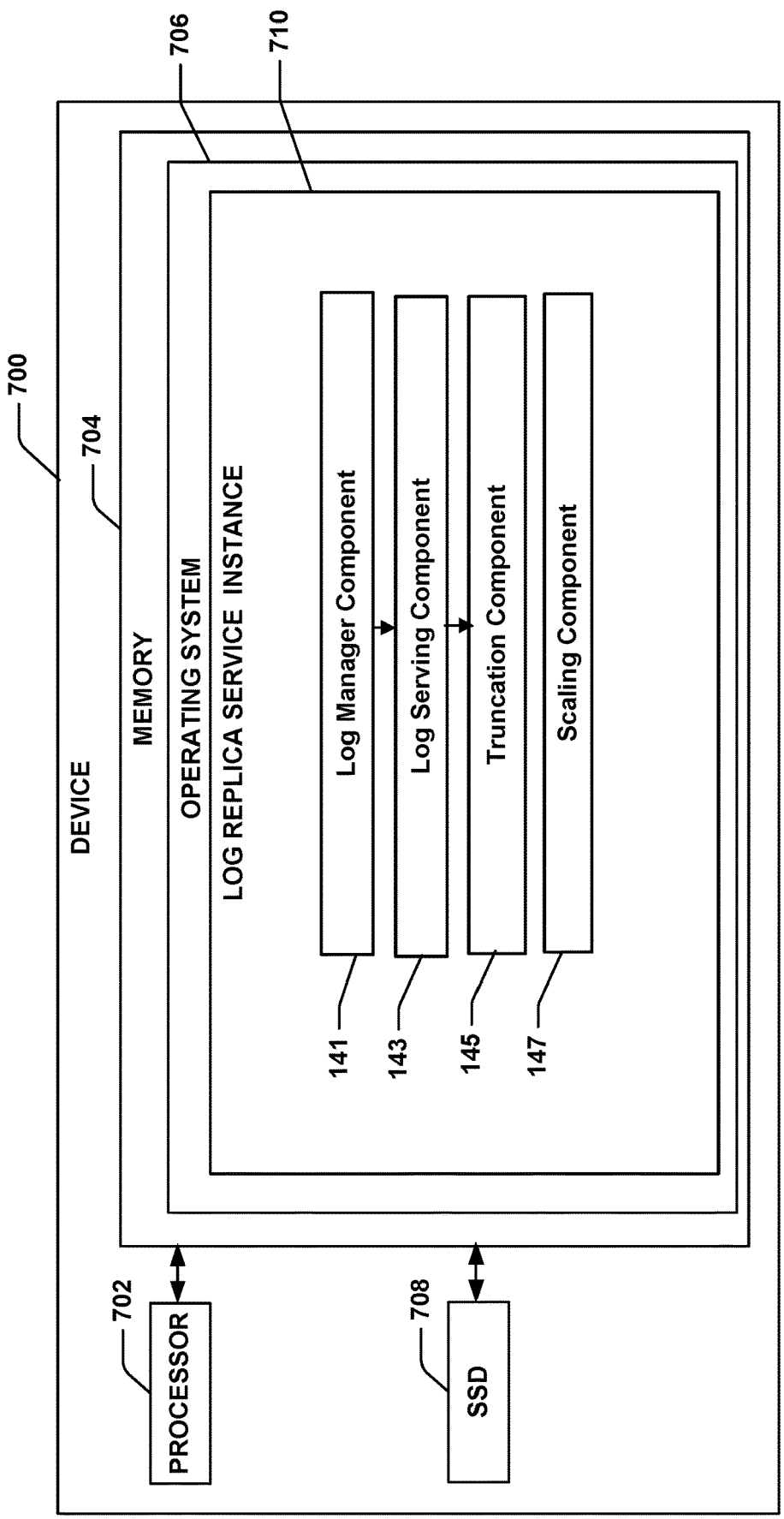
FIG. 7 is a schematic diagram of an example of an apparatus for executing an instance of a log replica service.

FIG. 7 is a schematic diagram of an example of an apparatus 700 (e.g., a computing device) for executing an instance of a log replica service 142. The apparatus 700 may be implemented as one or more computing devices in the network 120.

In an example, apparatus 700 can include a processor 702 and/or memory 704 configured to execute or store instructions or other parameters related to providing an operating system 706, which can execute one or more applications or processes, such as, but not limited to, a log replica service instance 710, which may include a log manager component 141, a log serving component 143, a truncation component 145, and a scaling component 147. For example, processor 702 and memory 704 may be separate components communicatively coupled by a bus (e.g., on a motherboard or other portion of a computing device, on an integrated circuit, such as a system on a chip (SoC), etc.), components integrated within one another (e.g., processor 702 can include the memory 704 as an on-board component), and/or the like. Memory 704 may store instructions, parameters, data structures, etc. for use/execution by processor 702 to perform functions described herein. The apparatus 700 can include a SSD 708 for storing log files.

The system 100 (FIG. 1) may include similar apparatuses for executing each of the compute service 132 and the page server service 152.

Figure 8:
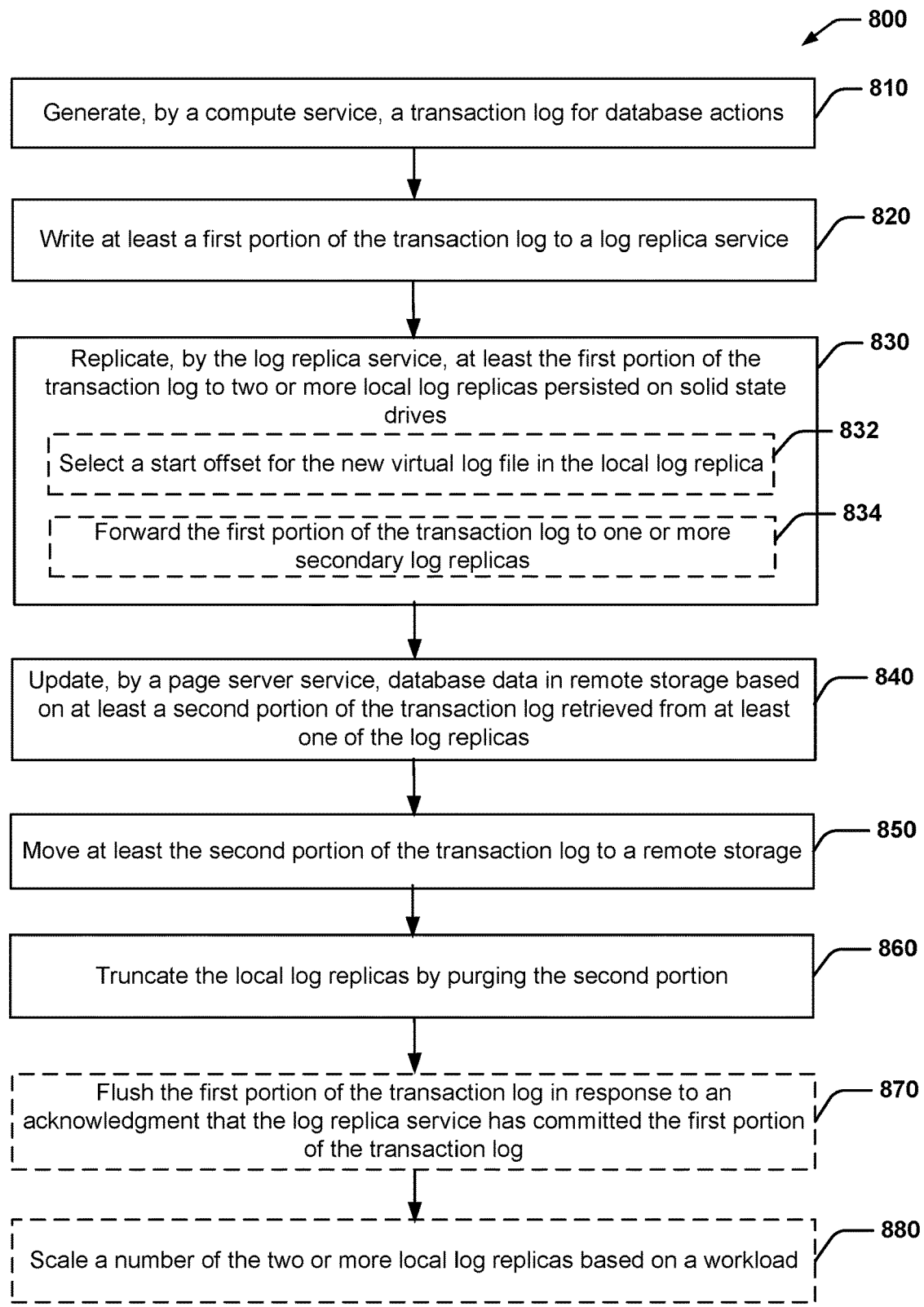
FIG. 8 is a flow diagram of an example of a method for performing database operations with log replicas.

FIG. 8 is a flow diagram of an example of a method 800 for performing database operations with log replicas. For example, the method 800 can be performed by the system 100 and/or one or more components thereof to perform database operations using the log replica service 142.

At block 810, the method 800 includes generating, by a compute service, a transaction log for database actions. In an example, the log component 134, e.g., in conjunction with processor 702, memory 704, and operating system 706, can generate, by a compute service, a transaction log 212 for database actions.

At block 820, the method 800 includes writing at least a first portion of the transaction log to a log replica service. In an example, the commit component 136, e.g., in conjunction with processor 702, memory 704, and operating system 706, can write the transaction log 212 to the log replica service 142. For instance, the commit component 136 may perform a commit operation on a series of previous database operations. The first portion of the transaction log may be a VLF. The log replica service 142 may receive the first portion of the transaction log via the IO FCB 214. The first portion of the transaction log may be received at the log replica service 142 as a new fixed size (VLF).

At block 830, the method 800 includes replicating, by the log replica service, at least a portion of the transaction log to two or more local log replicas persisted on solid state drives. In an example, the log manager component 141, e.g., in conjunction with processor 702, memory 704, and operating system 706, can replicate at least the first portion of the transaction log 212 to two or more local log replicas 146 persisted on solid state drives 144. For example, at sub-block 832, the block 830 may optionally include selecting a start offset for the new virtual log file in the local log replica. The start offset may be different than a start offset in a header of the first portion. The start offset may be selected to overwrite an old virtual log file in the local log replica that is not active, of the fixed size of the new virtual log file, of a different parity than the new virtual log file, and not marked for deferred truncation. If no old VLF matching the criteria is available, the log manager component 141 may extend the log with a new VLF. As discussed above, the host start offset for the local log replica 142 may be different than the guest start offset for the compute service. The local log replica 142 may store both the host start offset and the guest start offset. At sub-block 834, the block 830 may optionally include forwarding the first portion of the transaction log to one or more secondary log replicas 146. In some implementations, the secondary log replicas are hosted in different availability zones than the primary log replica. The log replica service 142 may acknowledge to the compute service 132 that the log replica service 142 has committed the portion of the transaction log in response to a quorum among the instances of the log replica service. In some implementations, a latency to commit at least the first portion of the transaction log is less than 1.5 milliseconds At block 840, the method 800 includes updating, by a page server service, database data in remote storage based on at least a second portion of the transaction log retrieved from at least one of the log replicas. In an example, the update component 153, e.g., in conjunction with processor 702, memory 704, and operating system 706, can update database data 222 in remote storage 154 based on at least a second portion of the transaction log 212 retrieved from at least one of the log replicas 142, 146. For example, the update component 153 may replay the second portion of the transaction log to determine the updates to the data 222.

At block 850, the method 800 includes moving at least the portion of the transaction log to a remote storage. In an example, the log moving component 155, e.g., in conjunction with processor 702, memory 704, and operating system 706, can move at least the portion of the transaction log 212 to a remote storage 154. For example, the log moving component 145 may copy the portion of the transaction log 212 to the complete log 220.

At block 860, the method 800 includes truncating the local log replicas by purging the portion. In an example, the truncation component 145, e.g., in conjunction with processor 702, memory 704, and operating system 706, can truncate the local log replicas 142. 146 by purging the portion (e.g., one or more VLFs). For example, the truncation component 145 may truncate the second portion of the local log replica in response to the second portion of the transaction log being moved to the remote storage and the second portion of the transaction log not being marked active by one or more other services.

At block 870, the method 800 optionally includes flushing the portion of the transaction log in response to an acknowledgment that the log replica service has committed the portion of the transaction log. In an example, the flushing component 138 of the compute service 132 may flush the portion of the transaction log 212 in response to an acknowledgment that the log replica service 142 has committed the portion of the transaction log 212.

At block 880, the method 800 optionally includes scaling a number of the two or more local log replicas 142, 146 based on a workload. In an example, the scaling component 147 of the log replica service 142 may scale the number of the two or more local log replicas 142, 146 based on a workload. For example, the primary log replica 142 may spawn additional secondary log replica 146 instances.

Figure 9:
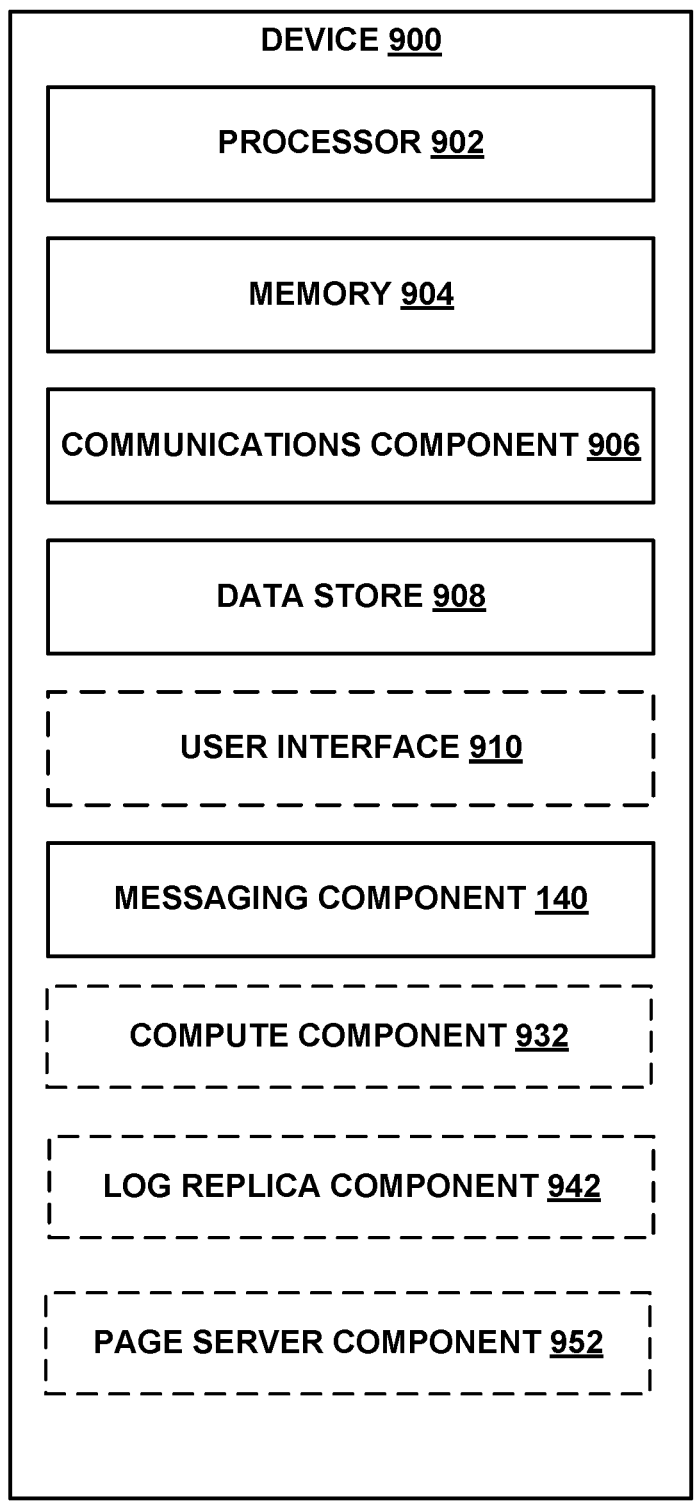
FIG. 9 is a diagram of an example of a device including additional optional component details as those shown in FIG. 7.

FIG. 9 illustrates an example of a device 900 including additional optional component details as those shown in FIG. 7. In one aspect, device 900 may include processor 902, which may be similar to processor 902 for carrying out processing functions associated with one or more of components and functions described herein. Processor 902 can include a single or multiple set of processors or multi-core processors. Moreover, processor 902 can be implemented as an integrated processing system and/or a distributed processing system.

Device 900 may further include memory 904, which may be similar to memory 904 such as for storing local versions of operating systems (or components thereof) and/or applications being executed by processor 902. For example, the memory 904 may store a compute component 932 including executable instructions for the compute service 132, a log replica component 942 including executable instructions for the log replica service 142, or a page server component 952 including executable instructions for the page server service 152, or any software components thereof. Memory 904 can include a type of memory usable by a computer, such as random access memory (RAM), read only memory (ROM), tapes, magnetic discs, optical discs, volatile memory, non-volatile memory, and any combination thereof.

Further, device 900 may include a communications component 906 that provides for establishing and maintaining communications with one or more other devices, parties, entities, etc. utilizing hardware, software, and services as described herein. Communications component 906 may carry communications between components on device 900, as well as between device 900 and external devices, such as devices located across a communications network and/or devices serially or locally connected to device 900. For example, communications component 906 may include one or more buses, and may further include transmit chain components and receive chain components associated with a wireless or wired transmitter and receiver, respectively, operable for interfacing with external devices.

Additionally, device 900 may include a data store 908, which can be any suitable combination of hardware and/or software, that provides for mass storage of information, databases, and programs employed in connection with aspects described herein. For example, data store 908 may be or may include a data repository for operating systems (or components thereof), applications, related parameters, etc. not currently being executed by processor 902. In addition, data store 908 may be a data repository for the compute service 132, the log replica service 142, or the page server service 152.

Device 900 may optionally include a user interface component 910 operable to receive inputs from a user of device 900 (e.g., datacenter maintenance personnel) and further operable to generate outputs for presentation to the user. User interface component 910 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, a switch/button, any other mechanism capable of receiving an input from a user, or any combination thereof. Further, user interface component 910 may include one or more output devices, including but not limited to a display, a speaker, a haptic feedback mechanism, a printer, any other mechanism capable of presenting an output to a user, or any combination thereof.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. Non-transitory computer-readable media excludes transitory signals. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A network system for providing a database, comprising:
a first server configured to host a compute service that is configured to:
generate a transaction log for database actions, and
commit at least a first portion of the transaction log to a log replica service;
one or more second servers, each comprising one or more solid state drives (SSDs) and configured to host the log replica service that is configured to:
replicate at least the first portion the transaction log to two or more local log replicas persisted on the SSDs of the one or more second servers,
serve at least a second portion of the transaction log to a requesting service, and
truncate the local log replicas by purging at least the second portion of the transaction log from the SSDs after the second portion of the transaction log is served to a page server service on a third server; and
the third server configured to host a page server service that is configured to:
retrieve at least the second portion of the transaction log from one or more of the local log replicas,
update database data in a remote storage based on at least the second portion of the transaction log retrieved from the one or more log replicas, wherein the remote storage is located on the third server remote from the first server and the second server, and
move at least the second portion of the transaction log to the remote storage, wherein the log replica service on the one or more second servers is configured to truncate at least the second portion of the transaction log in response to the second portion of the transaction log being moved to the remote storage on the third server and in response to a determination that the second portion of the transaction log is not actively being accessed by one or more other services.

2. The network system of claim 1, wherein a latency to commit at least the first portion of the transaction log is less than 1.5 milliseconds.

3. The network system of claim 1, wherein the two or more local log replicas are hosted in different availability zones.

4. The network system of claim 1, wherein the log replica service is further configured to scale a number of the two or more local log replicas based on a workload.

5. The network system of claim 1, wherein each local log replica of the log replica service operates in a log accept mode and hosts a tail of a log stream that is not synchronized with other instances of the log replica located on other servers of the one or more second servers.

6. The network system of claim 1, wherein the first portion of the transaction log is received at the log replica service as a new fixed size virtual log file.

7. The network system of claim 6, wherein the log replica service is configured to select a start offset for the new virtual log file in the local log replica, the start offset being different than a start offset in a header of the first portion and selected to overwrite an old virtual log file in the local log replica that is not active, of the fixed size of the new virtual log file, of a different parity than the new virtual log file, and not marked for deferred truncation.

8. The network system of claim 1, wherein the compute service is configured to flush the portion of the transaction log in response to an acknowledgment that the log replica service has committed the portion of the transaction log.

9. The network system of claim 1, wherein one of the local log replicas is a primary log replica configured to receive the first portion of the transaction log from the compute service and forward the first portion of the transaction log to one or more secondary log replicas.

10. A method of database management, comprising:
generating, by a compute service, a transaction log for database actions;
writing at least a first portion of the transaction log to a log replica service;
replicating, by the log replica service, at least the first portion of the transaction log to two or more local log replicas persisted on solid state drives of different servers;
updating, by a page server service, database data in a remote storage based on at least a second portion of the transaction log retrieved from at least one of the log replicas, the remote storage being remote from the compute service and the local log replicas;
moving at least the second portion of the transaction log to the remote storage; and
truncating the local log replicas by purging the second portion, wherein the log replica service on each of the different servers is configured to truncate at least the second portion of the transaction log in response to the second portion of the transaction log being moved to the remote storage and in response to a determination that the second portion of the transaction log is not actively being accessed by one or more other services.

11. The method of claim 10, wherein a latency to commit at least the first portion of the transaction log is less than 1.5 milliseconds.

12. The method of claim 10, wherein the two or more local log replicas are hosted in different availability zones.

13. The method of claim 10, further comprising scaling a number of the two or more local log replicas based on a workload.

14. The method of claim 10, wherein the determination that the second portion of the transaction log is not actively being accessed by one or more other services includes a determination that a number of virtual log files in the second portion that are held up by the one or more other services is greater than a maximum holdup count.

15. The method of claim 10, wherein the first portion of the transaction log is received at the log replica service as a new fixed size virtual log file.

16. The method of claim 15, wherein replicating at least the first portion of the transaction log comprises selecting a start offset for the new virtual log file in the local log replica, the start offset being different than a start offset in a header of the first portion and selected to overwrite an old virtual log file in the local log replica that is not active, of the fixed size of the new virtual log file, of a different parity than the new virtual log file, and not marked for deferred truncation.

17. The method of claim 10, further comprising flushing the first portion of the transaction log in response to an acknowledgment that the log replica service has committed the first portion of the transaction log.

18. The method of claim 10, wherein one of the local log replicas is a primary log replica configured to receive the first portion of the transaction log from the compute service and forward the first portion of the transaction log to one or more secondary log replicas.

19. A non-transitory computer-readable medium storing computer- executable code for an instance of a log replica service to replicate transaction log files for a database service, comprising code to:

receive at least a first portion of the transaction log from a compute service;

replicate at least the first portion the transaction log to two or more local log replicas persisted on solid state drives (SSDs) at one or more second instances of the log replica service on different servers;

serve at least a second portion of the transaction log to a requesting service including a page server service on a remote server including a remote storage, the remote server being remote from the compute service and the local log replicas, and truncate the local log replicas by purging at least the second portion of the transaction log from the SSDs in response to the second portion of the transaction log being moved to a remote storage and in response to a determination that the second portion of the transaction log is not actively being accessed by one or more other services.

20. The non-transitory computer-readable medium of claim 19, further comprising code to acknowledge to the compute service that the log replica service has committed the portion of the transaction log in response to a quorum among the instances of the log replica service.

\* \* \* \* \*